No. 871,377. PATENTED NOV. 19, 1907.
W. SWAGLER & W. L. VOLZ.
POULTRY FOUNTAIN.
APPLICATION FILED JULY 23, 1906.
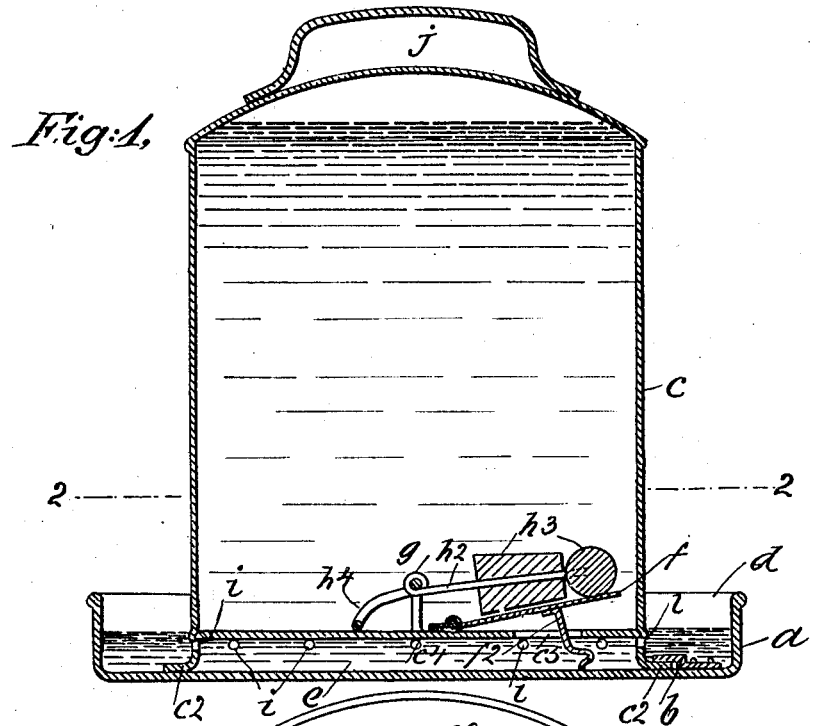
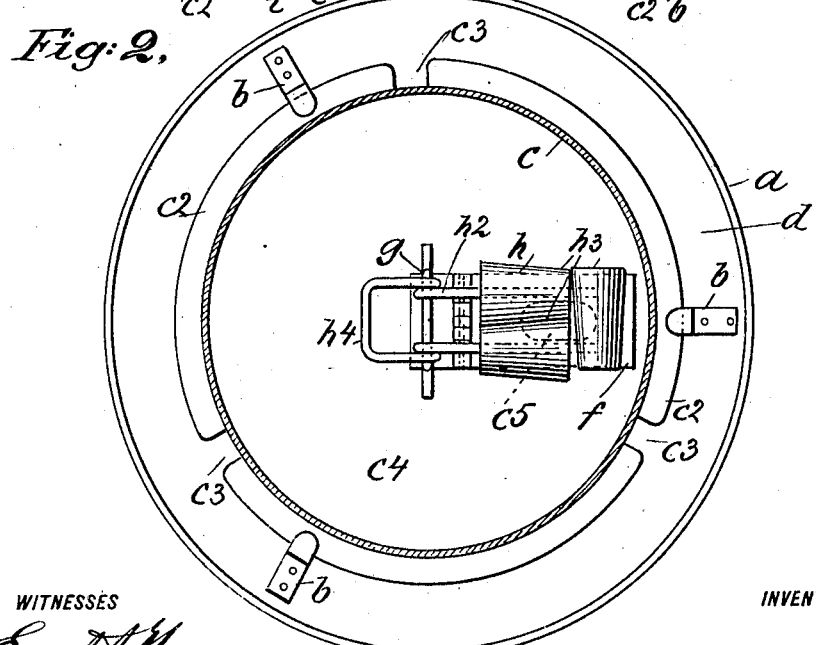

UNITED STATES PATENT OFFICE.

WILLIAM SWAGLER AND WILLIAM L. VOLZ, OF BROOKLYN, NEW YORK.

POULTRY-FOUNTAIN.

No. 871,377.  Specification of Letters Patent.  Patented Nov. 19, 1907.

Application filed July 23, 1906. Serial No. 327,267.

*To all whom it may concern:*

Be it known that we, WILLIAM SWAGLER and WILLIAM L. VOLZ, citizens of the United States, and residing at Brooklyn, in the county of Kings and State of New York, have invented certain new and useful Improvements in Poultry-Fountains, of which the following is a specification, such as will enable those skilled in the art to which it appertains to make and use the same.

This invention relates to means for watering poultry, chickens, geese, ducks or other barnyard fowl of this class, and the object thereof is to provide an improved device of this class which is automatic in operation and by means of which a requisite amount of water will always be automatically fed from a fountain into a trough or receiver where it may be easily reached by the poultry or other fowls; a further object being to provide a device of this class which may be used if desired for watering other animals as well as poultry or fowls.

The invention is fully disclosed in the following specification, of which the accompanying drawing forms a part, in which the separate parts of the improvement are designated by suitable reference characters in each of the views, and in which:—

Figure 1 is a central vertical transverse section of the improved poultry fountain; and, Fig. 2 a section on the line 2—2 of Fig. 1.

In the practice of our invention we provide a suitable pan or receiver $a$ which is preferably circular in form but may be of any desired shape, and the bottom of said pan or receiver is provided around the outer portion thereof with radially arranged keepers $b$ which open inwardly. We also provide a suitable can or receptacle $c$ which is of slightly less diameter than the pan or receiver $a$ and which is provided with a base flange $c^2$ having at regular intervals recesses or openings $c^3$ through which the keepers $b$ may be passed when the can or receptacle is set into the receiver or pan $a$, and by partially turning the can or receptacle it may be locked in the pan or receiver $a$, and when the parts are thus positioned the said pan or receiver and the bottom portion of the can or receptacle form an annular trough $d$.

The can or receptacle $c$ is provided with a raised bottom $c^4$ provided in one side with an opening $c^5$, and between the can or receptacle $c$ and the bottom of the pan or receiver $a$, when said parts are connected as shown in Fig. 1, is a chamber $e$.

Pivoted to the bottom $c^4$ of the can or receptacle $c$ is a valve $f$ having an arm $f^2$ adapted to pass through the opening $c^5$, and pivoted in the can or receptacle $c$ at $g$ is a float $h$ comprising a yoke-shaped member $h^2$ to which is secured a body or bodies $h^3$ of cork, and said frame $h^2$ is provided with a backwardly directed and downwardly curved shank $h^4$.

The can or receptacle $c$ is entirely closed except for the opening $c^5$ in the bottom thereof, and ports or passages $i$ are formed therein below the bottom $c^4$ and below the top of the pan or receiver $a$, and in practice the can or receptacle $c$ is inverted and filled with water through the opening $c^5$, after which the can is turned right end up and placed in the pan or receiver $a$ and so held that the keepers $b$ will pass through the recesses or openings $c^3$, after which the can or receptacle is partially turned and will be locked to the bottom of the pan or receiver $a$. In this operation the arm $f^2$ of the valve $f$ strikes the bottom of the pan or receiver $a$ and said valve is raised as shown in Fig. 1 and the water flows from the can or receptacle $c$ into the chamber $e$, from which it flows through the ports or passages $i$ into the trough $d$ until it rises in said trough above the ports or passages $i$ when the flow of water into said trough will be cut off.

The float $h$ is intended to raise the valve $f$ and close the opening $c^5$ when the can or receptacle $c$ is held in an inverted position and filled through said opening $c^5$, and this is the only function that said float has, and said float is not absolutely essential to the operation of the improved poultry fountain and may or may not be employed.

The can or receptacle $c$ is also provided with a handle $j$ by which it may be carried about, and the entire fountain, when the separate parts are connected as shown in Fig. 1, may be carried from one point to another by means of the handle $j$.

It will be apparent that this device may be made of any desired size or capacity and may be used wherever devices of this class are required.

Having fully described our invention, what we claim as new and desire to secure by Letters Patent, is:—

1. A fountain of the class described, comprising a pan or receiver and a closed can or receptacle having a raised bottom provided with an opening, and a valve pivoted to said bottom inside of said can and adapted to close said opening, said valve being provided with a finger which passes through said opening and bears on the bottom of the pan when the can is placed therein and raises said valve, and the side walls of the can or receptacle below the bottom thereof being provided with a port or passage.

2. A fountain of the class described, comprising a pan or receiver and a closed can or receptacle having a raised bottom provided with an opening, and a valve pivoted to said bottom inside of said can and adapted to close said opening, said valve being provided with a finger which passes through said opening and bears on the bottom of the pan when the can is placed therein and raises said valve, and the side walls of the can or receptacle below the bottom thereof being provided with ports or passages, and means for locking the can or receptacle to the bottom of the pan or receiver.

3. A fountain of the class described, comprising a pan or receiver and a closed can or receptacle having a raised bottom provided with an opening, and a valve pivoted to said bottom inside of said can and adapted to close said opening, said valve being provided with a finger which passes through said opening and bears on the bottom of the pan when the can is placed therein and raises said valve, and the side walls of the can or receptacle below the bottom thereof being provided with ports or passages, and means for locking the can or receptacle to the bottom of the pan or receiver, said can or receptacle being also provided with a pivoted float adapted to bear on the valve when the can or receptacle is inverted and filled.

In testimony that we claim the foregoing as our invention we have signed our names in presence of the subscribing witnesses.

WILLIAM SWAGLER.
WILLIAM L. VOLZ.

Witnesses:
F. A. STEWART,
C. J. KLEIN.